Patented Sept. 14, 1937

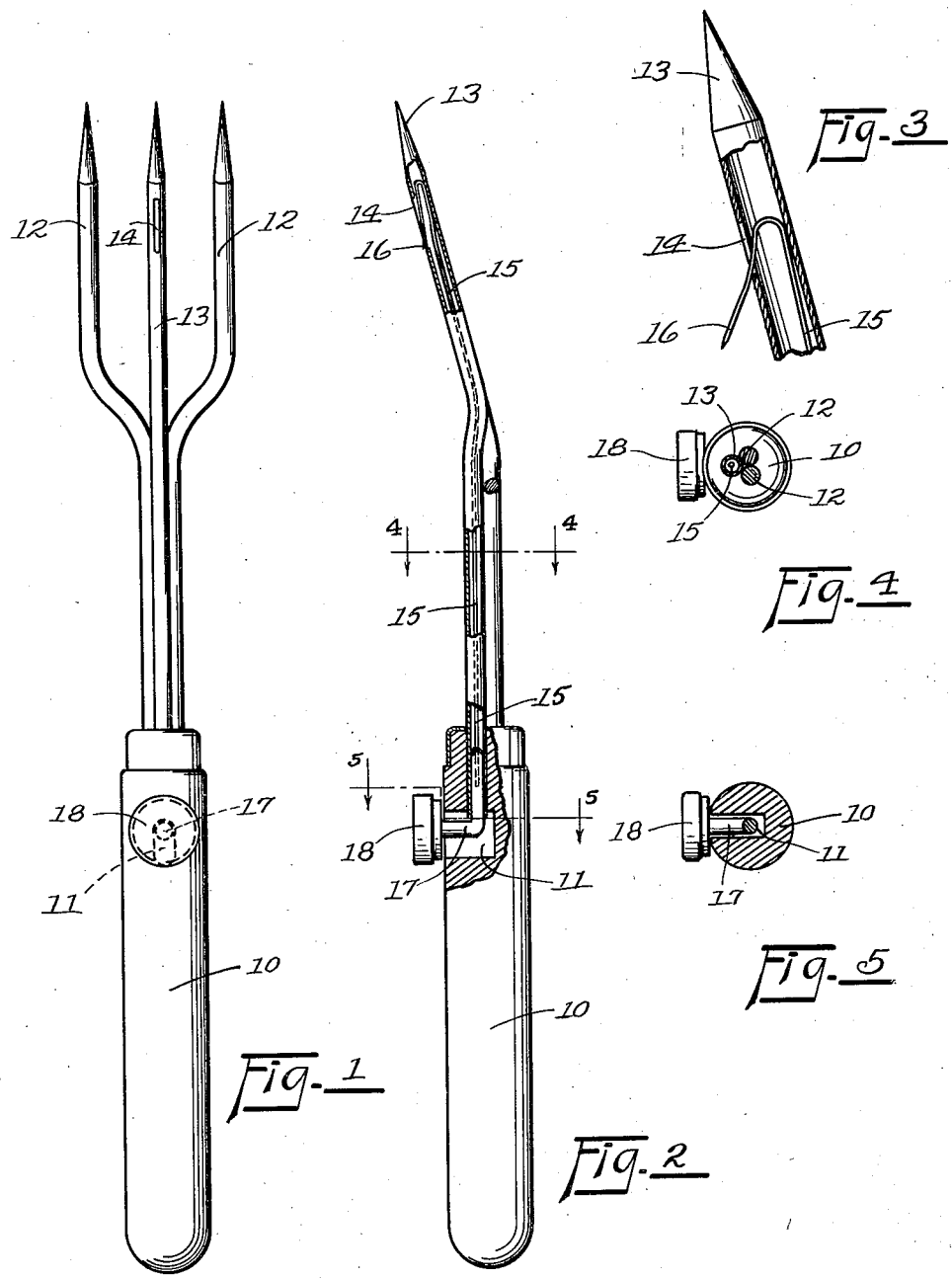

2,092,918

UNITED STATES PATENT OFFICE 2,092,918

CULINARY UTENSIL

Paul M. Imler, Burton Township, Genesee County, Mich.

Application December 19, 1936, Serial No. 116,672

6 Claims. (Cl. 30—137)

The instant invention relates to a culinary utensil and more particularly to a fork especially adapted for use in the kitchen of the home, restaurants or hotels.

The primary object of the present invention is to provide a fork having a barbed member operatively associated with a tine thereof whose point projects in a direction generally oppositely to that of the point of the tine and which barbed member is adapted to be manually selectively retracted relative to the length of the tine in instances wherein the fork is used to pierce food and to be manually selectively ejected relative to the length of the tine after the food has been thus pierced.

An illustrative embodiment of the invention is shown in the accompanying drawing, wherein:

Figure 1 is a plan view of the fork;

Figure 2 is a side view thereof, partly broken away to better show its operating parts;

Figure 3 is an enlarged fragmentary view of one of the fork tines and its manually operatively associated barbed member which tine is partially broken away to better show a feature of the invention;

Figure 4 is an enlarged sectional view thereof on line 4—4 of Figure 2; and

Figure 5 is an enlarged sectional view on line 5—5 of Figure 2.

Referring then to the drawing in which like parts of the device shown are designated by the same numerals in the several views, the fork there shown is provided with a conventional handle 10 having a slot or well 11 therein adjacent its inner end and from which extends a pair of outer tines 12 spaced apart at their outer ends.

A middle tine 13, here shown as tubular, is provided with a slot 14 near its point, the other end thereof being secured to the inner end of the handle 10 and in communication with the slot or well 11.

Disposed within this middle tubular tine is an elongated element 15 whose one end is reversely bent to provide a barb 16 disposed in juxtaposition with respect to the slot 14 and whose other end is secured to a member 17 slidable within the tubular tine 13 which member 17 is bent to extend through and exteriorly of the slot or well 11. The outer end of the member 17 is provided with a button 18 for manually oscillating the element 15 within and relatively to the tubular middle tine 13.

Operation

In operation and when it is desired to remove food from a container or the like, the button 18 is pushed forwardly toward the tines of the fork as shown in Figure 2 wherein the barb 16 is caused to assume the position there shown. After the food is pierced, the button 18 is reversely or rearwardly moved causing the barb 16 to be ejected outwardly from its slot 14 as shown in Figure 3. Food thus withdrawn from a container cannot be dropped from the fork until the button 18 is again moved forwardly whereupon the barb 16 is caused to be retracted within the slot 14.

It will thus be seen that the culinary utensil herein shown and described is both effective and efficient in use and while but one specific embodiment of this invention has been herein shown and described, it will be understood that certain details of the construction shown may be altered or omitted without departing from the spirit of this invention as defined by the following claims.

I claim:

1. In a device having a tine member, a movable barbed member operably associated therewith adapted to be retracted into substantial parallelism with the length of the tine member during one movement thereof and ejected at an angle relative to the length of the tine member during its opposite movement, and manually operable means for effecting selective movement of the barbed member.

2. In a device having a tine member, a barbed member operably associated therewith and longitudinally slidable relative to the length thereof adapted to be retracted into substantial parallelism with the length of the tine member during one of its sliding movements and ejected at an angle relative to the length of the tine member during its opposite sliding movement, and manually operable means connected with the barbed member for effecting its selective sliding movement.

3. In a device having a tubular tine provided with a slot therein, an element operably slidable longitudinally within said tubular tine and having a reversely bent barbed end disposed in juxtaposition with respect to said slot adapted to be ejected therethrough during one sliding movement of said element and retracted thereinto during the opposite sliding movement of said element, and manually operable means for effecting selective sliding movement of said element.

4. A triple tined fork having a middle tubular tine provided with a slot therein, an element operably slidable longitudinally within said tubular tine and having a reversely bent barbed end disposed in juxtaposition with respect to said slot adapted to be ejected therethrough during one sliding movement of said element and retracted thereinto during the opposite sliding movement of said element, and manually operable means for effecting selective sliding movement of said element.

5. A triple tined fork having a slotted handle and whose middle tine is tubular and is provided with a slot, an element operably slidable longitudinally within said tubular tine and whose one end projects exteriorly of the handle through the slot therein and whose opposite end is reversely bent and is disposed in juxtaposition with respect to the slot in said tubular tine through which it is adapted to be ejected during one sliding movement of said element and to be retracted thereinto during its opposite sliding movement, and manually operable means for effecting selective sliding movement of said element.

6. In a device having a tine member, a movable tine member operably associated therewith adapted to be retracted relative to the first said tine member during one movement thereof and to be ejected during its opposite movement, and manually operable means for effecting selective movement of the said second tine member.

PAUL M. IMLER.